Figures 1, 2:
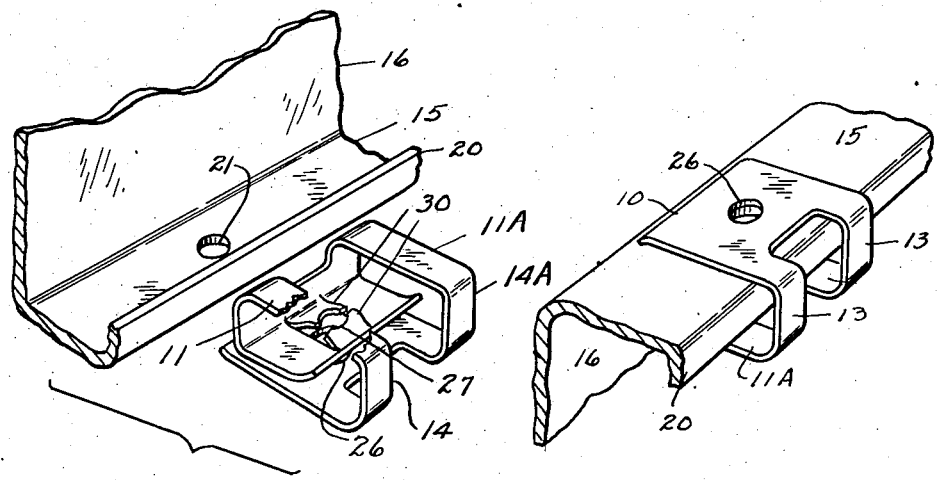

June 12, 1945.　　　G. A. TINNERMAN　　　2,378,258

FASTENING DEVICE

Filed Jan. 6, 1944

INVENTOR.
GEORGE A. TINNERMAN
BY
Bates, Teare, & McBean
ATTORNEYS

Patented June 12, 1945

2,378,258

UNITED STATES PATENT OFFICE 2,378,258

FASTENING DEVICE

George A. Tinnerman, Cleveland, Ohio, assignor to Tinnerman Products, Inc., Cleveland, Ohio, a corporation of Ohio Application January 6, 1944, Serial No. 517,183

5 Claims. (Cl. 85—36)

This invention relates to a fastening device adapted for ready mounting on a support, having a projecting flange, as for instance, a stringer, beam, or other structural member. Such stringers, particularly those employed as longerons in airplane work, are frequently in the form of rolled metal bars having a web with a projecting flange, such flange being frequently stiffened by an edge rib. It is desirable to be able to clamp said structure to various members, as conduits or a bundle of wires, or other devices, and to hold such members in place where they cross the projecting support or extend along it.

Heretofore, the practice for attaching equipment to rolled bead stringers in aircraft work, particularly where the stress limitations permit a drilled hole in the rolled section, has been to utilize a bolt receiving fastener which has been attached by two rivets to the stringer. This construction has, therefore, necessitated not only the drilling of a bolt receiving hole in the stringer, but also two additional holes for accommodating the rivets. An objection to this type of construction is not only the fact that the drilling of the rivet holes tends to weaken the stringer, but also the fact that in replacement work considerable time is lost in removing any possible defective nut and replacing it with another. This problem is accentuated by the fact that the fasteners in question are usually located behind other equipment, thereby necessitating considerable loss of time and labor to get at the defective nut and replace it.

The stringers, beams, or other structural members are employed in different sizes and shapes; hence, to provide a fastener for each size would not only increase the number of fasteners to be carried in stock to an objectionable degree, but in aircraft work particularly, it would be difficult to carry at each repair location fasteners of different size corresponding to the range of sizes of stringers used in the modern bomber, and yet it is necessary to have available fasteners for fitting all sizes of stringers.

An object of the present invention, therefore, is to provide a fastener which has sufficient flexibility to accommodate a wide range of stringer sizes. A further object is to provide a fastener which will eliminate the necessity for a riveting operation to the stringer, and which will greatly facilitate the time required to effect the assembly operation.

The present invention has solved the aforesaid difficulties by providing a fastening device in the form of a clip which embodies a strip of sheet metal that is reversely bent twice in the same direction so as to provide three spaced portions that extend in the same general direction and that are suitably apertured to receive a bolt. The stringer is adapted to be inserted between two of the portions which extend in the same general direction and the inherent resiliency of the material is adequate to retain the fastener in bolt receiving position on the stringer. The arrangement is such that whenever a bolt is passed through the superimposed portions of the fastener, two of such portions are drawn tightly against the flange of the stringer, whereby a clamping engagement is effected therewith.

Figures 3, 4:
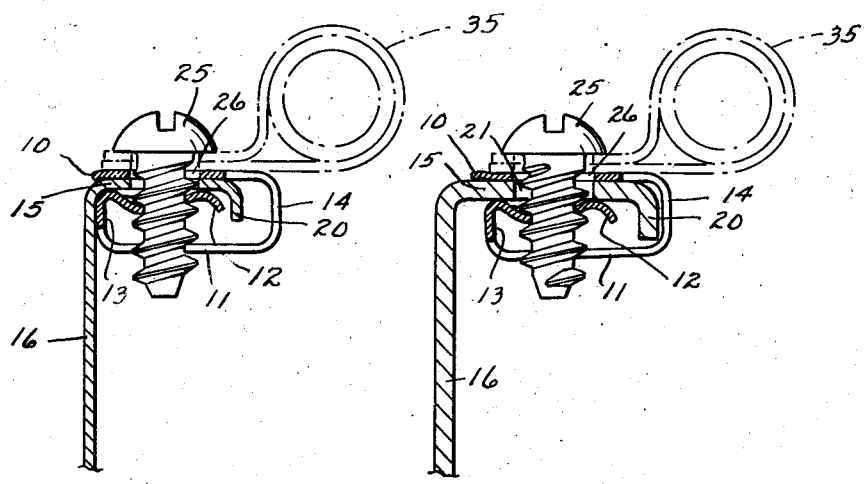

In the drawing, Fig. 1 is a perspective view of a fastener embodying my invention, showing the position thereof with respect to the flange of a stringer preparatory to assembly; Fig. 2 is a perspective view showing a bottom view of the fastener as applied to the stringer; Fig. 3 is a sectional view taken transversely through the stringer and fastener, and Fig. 4 is a sectional view similar to Fig. 3, but illustrating the use of the fastener on a different sized stringer.

My fastening device is made from a single strip of spring sheet metal which has the end portions thereof bent upwardly and inwardly to form overlapping arms 10 and 12 which are connected by intermediate connecting portions 13 and 14, respectively. The arms are superimposed, but are spaced apart so as to afford access for the flange 15 of a stringer 16, as shown, particularly in Figs. 3 and 4.

The spaced overlapping relationship between the arms 10 and 12 permits the fastener to be sprung over the marginal lip 20 and quickly assembled onto the flange in the region of the bolt-receiving opening 21 therein. The bolt or screw 25 with which the fastener is intended to be used, is adapted to extend through registering openings 26 and 27, in the arms 10 and 12, respectively, and to extend between the body portions 11 and 11a which are formed by a central opening 15. Removing the central portion of the body structure not only lightens the weight of the fastener, but also increases the flexibility thereof for attachment to a stringer. By extending the opening along an end portion there is provided a connecting portion 14 and a connecting portion 14a between the arm 10 and the body portions 11 and 11a respectively.

To engage a bolt or screw 25, I provide a thread-engaging portion on the arm 12 in the form of tongues 30 which are partially severed from the arm 12 and are disposed at an acute angle thereto, and have their end portions recessed and warped so as to define a helical turn.

From the foregoing description, it will be apparent that if a threaded bolt or screw is passed through the openings 26 and 27, its thread may be engaged by the tongues 30 which act as a nut therefor, and then as the bolt or screw is tightened, the arms 10 and 12 are caused to clamp upon the flange 15 that is interposed between them. Thus, by means of a single tightening operation, not only is the conduit clamp 35 held securely in place upon the stringer, but in addition, a locking action is effected between the screw and the nut at the same time. By making the arm 12 terminate short of the arm 10, the end thereof acts as an abutment to engage a bead on the stringer and thereby hold the fastener in bolt receiving position thereon.

A fastener of this construction is well adapted for accommodating a variety of sizes and shapes of rolled or extruded sections, and not only eliminates the necessity for using specifically different fastening devices for such different sizes and shapes, but also eliminates the necessity for drilling the flange of the stringer to accommodate rivets which heretofore have been employed.

I claim:

1. A fastening device comprising a single strip of spring sheet metal having one end portion thereof reversely bent but spaced therefrom to provide a top arm and having the other end portion reversely bent to provide a second arm extending between said strip and top arm and disposed in spaced relationship thereto, the second arm terminating short of the top arm and providing an article receiving space therebetween, and one of said arms having a thread-engaging portion carried thereby.

2. A fastening device embodying a single strip of spring sheet material having the end portions thereof reversely bent toward each other on the same side of the strip so as to provide spaced arms for receiving an article to which the device is to be applied, said strip having a centrally disposed longitudinal opening therein defining spaced body portions which connect the arms together, one of the arms having an opening therein for receiving a bolt or the like and the other arm having a bolt opening and the material of that arm being diverted from the plane thereof about the opening therethrough to provide means for engaging the thread of a bolt which extends through said openings.

3. A fastening device embodying a single strip of spring metal having a body portion and having the end portions thereof bent upwardly and then inwardly toward each other so as to provide two arms in superimposed spaced relationship from each other on the same side of the strip, means on one of the arms for engaging the thread of a bolt or the like that is adapted to extend therethrough, and one of the arms terminating short of the connection between the other arm and the body portion and adapted to operate as an abutment for retaining the device in bolt receiving position on a part to be joined.

4. A fastening device comprising a single strip of spring sheet metal having one end portion thereof reversely bent but spaced therefrom to provide a top arm and having the other end portion reversely bent to provide a second arm extending between said strip and top arm and disposed in spaced relationship thereto, and one of said arms having a bolt opening entirely surrounded by the material of the arm, and material of the intermediate arm being diverted from the plane thereof about the opening therethrough to provide thread-engaging means carried thereby adjacent the opening therein.

5. A fastening device comprising a single strip of spring material bent on itself in four parallel regions to provide successively an end arm, a connecting portion, a body portion spaced from said end arm, another connecting portion leaving from the opposite end of said body portion, and a final arm terminating short of the first-mentioned connecting portion and having a bolt opening diverted from the plane thereof and warped to provide a helical edge adapted to engage the thread of a bolt passing through the first and second arms.

GEORGE A. TINNERMAN.